H. LEE.
ROTARY ENGINE.
APPLICATION FILED OCT. 8, 1907.

902,239.

Patented Oct. 27, 1908.

2 SHEETS—SHEET 1.

Witnesses.

Inventor.

H. LEE.
ROTARY ENGINE.
APPLICATION FILED OCT. 8, 1907.

902,239.

Patented Oct. 27, 1908.

2 SHEETS—SHEET 2.

Witnesses.

Inventor.
Herbert Lee

UNITED STATES PATENT OFFICE.

HERBERT LEE, OF KENSINGTON, NEW SOUTH WALES, AUSTRALIA.

ROTARY ENGINE.

No. 902,239.   Specification of Letters Patent.   Patented Oct. 27, 1908.

Application filed October 8, 1907. Serial No. 396,389.

*To all whom it may concern:*

Be it known that I, HERBERT LEE, a subject of the King of Great Britain and Ireland, residing at Bowral street, Kensington, near Sydney, in the State of New South Wales, in the Commonwealth of Australia, have invented certain new and useful Improvements in Rotary Steam-Engines, of which the following is a specification.

The purpose of this invention is to provide a rotary steam engine which by reason of consisting of fewer parts, will be simpler of construction and more highly efficient than any of those now in use and which will be capable of being instantaneously reversed.

Figure 1:
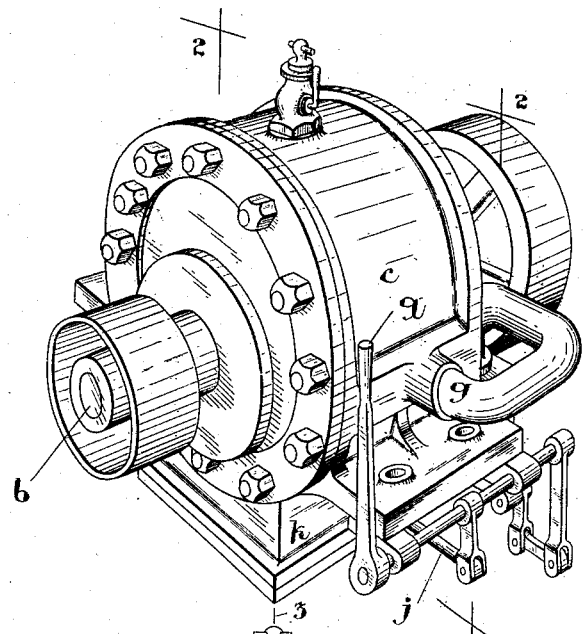
Figure 2:
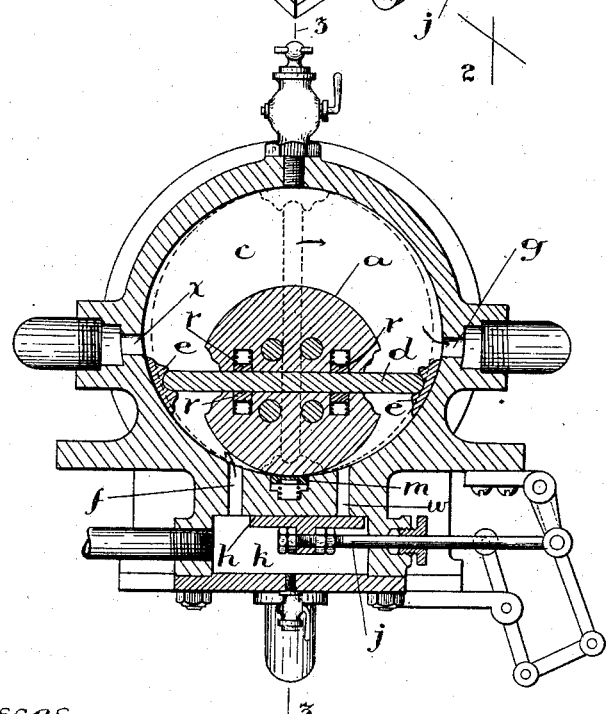
Figure 3:
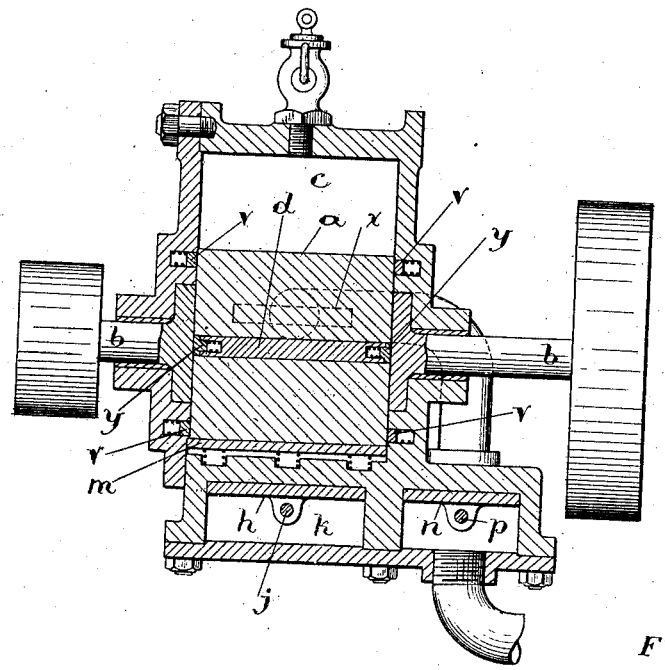
Figure 4:
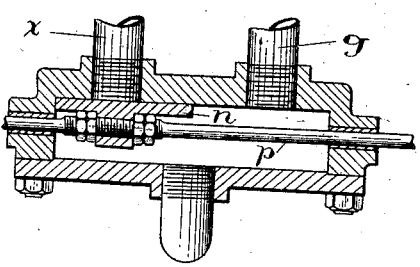
Figure 5:
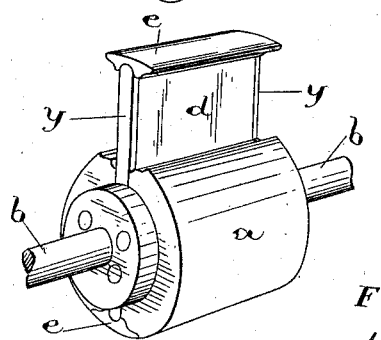

The essential features of the invention consist of a vane or piston (hereinafter called the piston) sliding backwards and forwards through a hub rotating within a cylinder of peculiar construction as hereinafter described. But in order that my invention may be clearly understood I shall now refer to the accompanying drawings in which Figure 1 is a perspective view of the engine complete. Fig. 2 is section on plane 2—2 of Fig. 1. Fig. 3 is section on line 3—3 of Fig. 2. Fig. 4 is cross section through exhaust chamber. Fig. 5 is perspective view of the piston vane.

The hub $a$ is secured to the spindle $b$ within the cylinder $c$ and is carried round in its course by the sliding piston $d$ provided with the shoes $e, e$ fulcrumed thereon. The steam enters the steam chest $k$ by the pipe $t$, passes through one of the ports $f$ or $w$ and escapes by one of the exhaust ports $g$ or $x$. A slide valve $h$ attached to the rod $j$ operates within the steam chest closing either of the ports as required. The outer periphery of the hub is recessed, as shown, to permit of the shoes $e, e$ receding therein when the piston obtains its maximum projection in the opposite direction (as indicated by the dotted lines in Fig. 2). The aperture in the hub through which the piston slides is rendered steam-tight by the packing bars $r, r$. Packing rings $v, v$ are provided within the walls of the cylinder for the purpose of forming steam tight joints with the ends of the hub, while another packing block $m$, forms a similar joint with its outer periphery. A packing block $y$ is provided on either edge of the piston to form steam-tight joints with the vertical sides of the cylinder.

The exhaust chamber contains a slide valve $n$ secured to the rod $p$ for the purpose of closing either exhaust port at will. Both slide valves $h$ and $n$ are operated by the lever handle $q$ and the necessary connecting rods (as shown in Fig. 1.) The parts are so adjusted that the steam-port and the exhaust on opposite sides of the hub are open at the same time.

The method of obtaining the correct formation of the inner periphery of the cylinder is as follows:—A circle with a diameter of the length of the piston is marked, then on a center line of this circle another circle is described of a radius equal to that of the hub. The center of the smaller circle is at a point on the center line of the larger one, which will permit of the circumferences of the two circles touching at one point (as shown in Fig. 2).

In arriving at the actual contour of the cylinder it will be necessary to deviate from the true circle as much as is necessary to permit the ends of the piston when revolving therein to maintain continuous contact with the periphery of the cylinder, see Fig. 2, wherein the circumference of the true circle is indicated by the dotted lines.

The method of operating the invention is as follows:—The parts being in the positions shown in Fig. 2, when the steam is admitted into the steam chest $k$, passing through the open port $f$ into the cylinder, it bears on the face of the piston, forcing it round in clockwise direction (as indicated by the arrowheads) thus rotating the hub and its spindle.

When in the position shown in Fig. 2 the piston is balanced, an equal area of it projecting either way from the hub, but on account of the position of the hub and the form of the inner periphery of the cylinder, as the piston moves forward, one end is driven into the hub and the other is projected further outwards till, when the vertical position is reached, one of the end-shoes has receded within the recess cut for it in the periphery of the hub, while the other end of the piston is projected its maximum distance (see dotted lines in Fig. 2). As the piston continues its course onward from the vertical, the projected end begins to recede and the other to project from the hub till, when the horizontal is reached, the equipoise is again established.

It is obvious that the shoes $e, e$ fulcrumed on the ends of the piston, moving in conformity with the contour of the cylinder must maintain throughout a steam-tight contact therewith.

When it is desired to reverse the engine, the lever handle $q$ is pulled over which movement causes the valves $h$ and $n$ to close respectively the admission port $f$ and the exhaust port $g$ and to open the admission port $w$ and exhaust port $x$. This will cause the piston to move round the cylinder in the direction opposite to that indicated by the arrow heads.

What I claim and desire to secure by Letters Patent is:—

1. A rotary engine comprising an engine cylinder, a cylindrical piston hub revolubly mounted in the engine cylinder and eccentrically arranged with regard to the inner circumference thereof, a piston slidable through the piston hub, shoes fulcrumed to the ends of the piston engaging with the inner surface of the engine cylinder, packing bars within the piston hub engaging the piston, packing rings within the wall of the cylinder engaging the ends of the piston hub, a packing block within the cylinder engaging the peripheral surface of the hub and packing blocks for the side edges of the piston to engage with the inner surface of the cylinder.

2. A rotary engine comprising an engine cylinder a cylindrical piston hub revolubly mounted in the engine cylinder and eccentrically arranged with regard to the inner circumference thereof, a piston slidable through the piston hub, shoes fulcrumed to the ends of the piston engaging with the inner surface of the engine cylinder, packing bars within the piston hub engaging the piston, packing rings within the walls of the cylinder engaging the ends of the piston hub, a packing block within the cylinder engaging the peripheral surface of the hub, packing blocks for the side edges of the piston to engage with the inner surface of the cylinder, a steam chest, an inlet pipe for the steam chest, ports for the admission of the steam from the steam chest into the engine cylinder, exhaust ports for the engine cylinder slide valves controlling the exhaust ports, and means for actuating the slide valves.

3. A rotary engine comprising an engine cylinder a cylindrical piston hub revolubly mounted in the engine cylinder and eccentrically arranged with regard to the inner circumference thereof, a piston slidable through the piston hub, shoes fulcrumed to the ends of the piston engaging with the inner surface of the engine cylinder, packing bars within the piston hub engaging the piston, packing rings within the walls of the cylinder engaging the ends of the piston hub, a packing block within the cylinder engaging the peripheral surface of the hub, packing blocks for the side edges of the piston to engage with the inner surface of the cylinder, a steam chest, an inlet pipe for the steam chest, ports for the admission of the steam from the steam chests into the engine cylinder, exhaust ports for the engine cylinder, slide valves controlling the exhaust ports, means for actuating the slide valves, and means for reversing the action of the slide valves controlling the inlet and outlet ports.

In testimony whereof I affix my signnature in presence of two witnesses.

HERBERT LEE.

Witnesses:
 WILLIAM NEWTON,
 WALTER SIGMONT.